(12) United States Patent
Kudo

(10) Patent No.: US 9,374,539 B2
(45) Date of Patent: Jun. 21, 2016

(54) IMAGE PICKUP CIRCUIT

(71) Applicant: Sony Corporation, Tokyo (JP)

(72) Inventor: Shigetaka Kudo, Kanagawa (JP)

(73) Assignee: Sony Corporation, Tokyo (JP)

(*) Notice: Subject to any disclaimer, the term of this patent is extended or adjusted under 35 U.S.C. 154(b) by 0 days.

(21) Appl. No.: 14/963,132

(22) Filed: Dec. 8, 2015

(65) Prior Publication Data

US 2016/0094795 A1     Mar. 31, 2016

Related U.S. Application Data

(63) Continuation of application No. 14/689,883, filed on Apr. 17, 2015, which is a continuation of application No. 13/343,177, filed on Jan. 4, 2012, now Pat. No. 9,041,839, which is a continuation of application No. 12/197,372, filed on Aug. 25, 2008, now Pat. No. 8,102,449.

(30) Foreign Application Priority Data

Aug. 31, 2007    (JP) ................................. 2007-225208

(51) Int. Cl.
    *H04N 5/359*     (2011.01)
    *H04N 5/335*     (2011.01)
    (Continued)

(52) U.S. Cl.
    CPC ............ *H04N 5/335* (2013.01); *H04N 5/3658* (2013.01); *H04N 5/3698* (2013.01); *H04N 5/378* (2013.01); *H04N 5/3741* (2013.01); *H04N 5/37455* (2013.01)

(58) Field of Classification Search
    CPC . H04N 5/3595; H04N 5/3728; H04N 5/2175; H04N 3/155; H04N 5/378; H04N 5/335; H04N 5/37455; H04N 5/3741; H04N 5/3658
    See application file for complete search history.

(56) References Cited

U.S. PATENT DOCUMENTS 5,790,191 A * 8/1998 Zhang .................. H04N 3/1512
                                                               348/300
6,433,822 B1 * 8/2002 Clark ..................... H04N 3/155
                                                               348/241

(Continued)

FOREIGN PATENT DOCUMENTS

| JP | 2002-232785 | 8/2002 |
|---|---|---|
| JP | 2005-184634 | 7/2005 |

(Continued)

OTHER PUBLICATIONS

Japanese Office Action issued on Jun. 16, 2009 in connection with Japanese Application No. 2007-225208.

*Primary Examiner* — Aung S Moe
(74) *Attorney, Agent, or Firm* — Wolf, Greenfield & Sacks, P.C.

(57) ABSTRACT

An image pickup circuit including a plurality of circuit blocks. Each of the plurality of circuit blocks includes a plurality of comparing elements, a single counter, and a plurality of storage units. Each of the comparing elements compares a pixel signal supplied through a vertical signal line connected to vertically aligned pixels in a plurality of pixels arranged in a matrix, and a slope signal whose voltage is changed from an initial voltage at a constant slope. The counter counts an elapsed time since a voltage of the slope signal starts to change from the initial voltage. Each of the storage units stores a count value obtained by the counter in accordance with a comparison result of the comparator, the count value corresponding to an elapsed time until the voltage of the slope signal is changed from the initial voltage to a voltage coinciding with the pixel signal.

30 Claims, 8 Drawing Sheets

(51) Int. Cl.
  *H04N 5/365* (2011.01)
  *H04N 5/369* (2011.01)
  *H04N 5/374* (2011.01)
  *H04N 5/3745* (2011.01)
  *H04N 5/378* (2011.01)

(56) References Cited

U.S. PATENT DOCUMENTS

| | | | |
|---|---|---|---|
| 6,559,788 B1 | 5/2003 | Murphy | |
| 6,885,396 B1* | 4/2005 | Panicacci | H04N 5/3575 250/208.1 |
| 6,933,972 B2* | 8/2005 | Suzuki | H04N 9/045 250/208.1 |
| 7,283,080 B2* | 10/2007 | Kirsch | H04N 3/1575 341/155 |
| 7,532,148 B2* | 5/2009 | Muramatsu | H03M 1/1019 250/333 |
| 7,554,066 B2* | 6/2009 | Yan | H04N 5/3658 250/208.1 |
| 7,688,365 B2* | 3/2010 | Inui | H01L 27/14643 348/241 |
| 7,859,581 B2* | 12/2010 | Guidash | H04N 3/1562 348/302 |
| 7,864,237 B2 | 1/2011 | Muramatsu | |
| 7,924,335 B2* | 4/2011 | Itakura | H03N 5/235 250/208.1 |
| 8,102,449 B2 | 1/2012 | Kudo | |
| 8,237,808 B2* | 8/2012 | Matsumoto | H04N 5/347 348/222.1 |
| 8,310,577 B1* | 11/2012 | Neter | H04N 5/365 348/308 |
| 9,041,839 B2 | 5/2015 | Kudo | |
| 2002/0154347 A1* | 10/2002 | Funakoshi | H04N 3/1562 358/513 |
| 2002/0167611 A1 | 11/2002 | Boemler et al. | |
| 2004/0041931 A1* | 3/2004 | Tu | H04N 5/335 348/300 |
| 2005/0195304 A1* | 9/2005 | Nitta | H03M 1/1023 348/308 |
| 2006/0050162 A1* | 3/2006 | Nakamura | H04N 5/335 348/308 |
| 2006/0092304 A1 | 5/2006 | Hirota | |
| 2006/0125940 A1* | 6/2006 | Tinkler | H04N 5/367 348/294 |
| 2006/0214821 A1* | 9/2006 | Roh | H03M 1/1071 341/50 |
| 2006/0227228 A1* | 10/2006 | Nam | H04N 5/347 348/272 |
| 2006/0267054 A1* | 11/2006 | Martin | H01L 27/14632 257/291 |
| 2007/0030187 A1* | 2/2007 | Muramatsu | H03K 5/2481 341/118 |
| 2008/0117321 A1* | 5/2008 | Muramatsu | H04N 3/155 348/308 |
| 2008/0151088 A1* | 6/2008 | Frey | G01N 27/3275 348/308 |
| 2008/0180555 A1* | 7/2008 | Sato | H04N 5/3452 348/248 |
| 2009/0059024 A1* | 3/2009 | Kudo | H04N 5/335 348/222.1 |
| 2012/0086842 A1* | 4/2012 | Oike | H03M 1/1023 348/308 |
| 2012/0104234 A1 | 5/2012 | Kudo | |
| 2015/0222835 A1 | 8/2015 | Kudo | |

FOREIGN PATENT DOCUMENTS

| | | |
|---|---|---|
| JP | 2005-278135 | 10/2005 |
| JP | 2005-311237 | 11/2005 |
| JP | 2005-347932 | 12/2005 |
| JP | 2005-348324 | 12/2005 |
| JP | 2006-080861 | 3/2006 |
| JP | 2007-036916 | 2/2007 |

* cited by examiner

IMAGE PICKUP CIRCUIT

RELATED APPLICATION DATA

The present application claims the benefit under 35 U.S.C. §120 as a continuation application of U.S. application Ser. No. 14/689,883, filed Apr. 17, 2015, which is a continuation application of U.S. application Ser. No. 13/343,177, filed Jan. 4, 2012, now U.S. Pat. No. 9,041,839, issued on May 26, 2015, which is a continuation application of U.S. patent application Ser. No. 12/197,372, filed Aug. 25, 2008, now U.S. Pat. No. 8,102,449, issued on Jan. 24, 2012, which in turn claims priority to Japanese Patent Application No. JP 2007-225208 filed on Aug. 31, 2007, the entire contents of each of which is incorporated herein by reference.

BACKGROUND OF THE INVENTION

The present invention relates to an image pickup circuit.

In the recent years, solid-state image pickup devices such as CMOS (complementary metal oxide semiconductor) sensors have been widely implemented to portable telephones, compact digital cameras, high-class single-lens reflex cameras, camcorders, monitor cameras and guide apparatuses.

Recently, there has been developed a high performance sensor including an on-chip processing blocks such as an image processing circuit together with a CMOS sensor to thereby output high quality images.

For example, sensors employing column-parallel A/D (analog to digital) conversion method (hereinafter referred for convenience to as "column AD method") have been proposed.

In the column AD method, an A/D converter is provided for every column of pixels (hereinafter referred to as a "column" where appropriate), and the pixel signals (analog signals) of individual pixels for the respective columns are read by one operation and then A/D converted directly.

Further, the column AD method employs parallel processing for every horizontal line in an image, thus eliminating the necessity for high-frequency horizontal scanning. This enables the A/D conversion to be performed vertically at a low frequency, making it easy to separate signal components and noise components generated in a high frequency band.

The configuration of a solid-state image pickup device employing the column AD method will be described here with reference to FIGS. 1 and 2.

FIG. 1 is a block diagram showing the configuration of an example of the solid-state image pickup device employing the column AD method.

In FIG. 1, a solid-state image pickup device 11 includes a vertical scanning circuit 21, a pixel array 22, vertical signal lines $23_1$ to $23_N$ (N is a positive integer), current sources $24_1$ to $24_N$, a slope generating circuit 25, comparators $26_1$ to $26_N$, and counters $27_1$ to $27_N$.

Under control of the controller (not shown), the vertical scanning circuit 21 supplies sequentially output control signals for controlling the outputs of pixel signals to vertically aligned pixels $22_1$ to $22_N$ in the pixel array 22 at a predetermined timing.

The pixel array 22 is composed of a plurality of pixels arranged in a matrix. FIG. 1 shows the pixels $22_1$ to $22_N$ disposed in a horizontal direction for one line, with the vertically aligned pixels omitted. In the pixel array 22, the individual pixels $22_n$ which are vertically aligned output sequentially a pixel signal on the basis of the output control signal supplied from the vertical scanning circuit 21.

In the pixel array 22 of FIG. 1, the N pixels $22_1$ to $22_N$ are disposed horizontally (horizontal direction). The pixels $22_n$ (n=1, 2, . . . , N) photoelectrically convert the incident light, and output the pixel signal of a voltage corresponding to the light. These pixels $22_1$ to $22_N$ are connected to the N vertical signal lines $23_1$ to $23_N$, respectively, and the pixel signals outputted from the pixels $22_1$ to $22_N$ are supplied through the vertical signal lines $23_1$ to $23_N$ to one of two input terminals in each of the N comparators $26_1$ to $26_N$, respectively. The pixels $22_1$ to $22_N$ are also grounded through the N current sources $24_1$ to $24_N$, respectively.

The slope generating circuit 25 supplies a slope signal, whose voltage drops (or rises) at a constant slope from a predetermined initial voltage, to the other of the two input terminals in each of the N comparators $26_1$ to $26_N$, respectively.

The comparators $26_1$ to $26_N$ compare the pixel signals supplied from the pixels $22_1$ to $22_N$, and the slope signal supplied from the slope generating circuit 25, and supply comparative signals representing the comparison results to the N counters $27_1$ to $27_N$, respectively.

The counters $27_1$ to $27_N$ count a predetermined clock signal on the basis of the comparative signals supplied from the comparators $26_1$ to $26_N$, respectively, and supply the count values to the circuit of the subsequent stage (not shown). In the circuit of the subsequent stage, pixel data (pixel values) are outputted on the basis of the count values supplied from the counters $27_1$ to $27_N$.

In FIG. 1, the slope generating circuit 25, the comparators $26_n$, and the counters $27_n$ constitute the A/D converter.

The solid-state image pickup device 11 thus configured necessitates the counters corresponding to the number N of the columns, thereby increasing the circuit area and power consumption.

FIG. 2 is a block diagram showing the configuration of other example of the solid-state image pickup device employing the column AD method.

In FIG. 2, the same references have been used as in FIG. 1 for similar components, and the description thereof is omitted.

In FIG. 2, a solid-state image pickup device 31 includes a vertical scanning circuit 21, a pixel array 22, vertical signal lines $23_1$ to $23_N$, current sources 241 to $24_N$, a slope generating circuit 25, comparators $26_1$ to $26_N$, a counter 41, and latch circuits $42_1$ to $42_N$.

Each of the comparators $26_1$ to $26_N$ supply comparative signals representing the comparison results, to the N latch circuits $42_1$ to $42_N$, respectively. The comparative signals are obtained by comparing the pixel signals supplied from the pixels $22_1$ to $22_N$ and the slope signal supplied from the slope generating circuit 25.

The counter 41 counts a predetermined clock signal and supplies the count value to the latch circuits $42_1$ to $42_N$, respectively.

The latch circuits $42_1$ to $42_N$ store the count values counted by the single counter 41 in response to the comparative signals from the comparators $26_1$ to $26_N$, and supply the stored count values to the circuit of the subsequent stage (not shown). In the circuit of the subsequent stage, pixel data are outputted on the basis of the count values supplied from the latch circuits $42_1$ to $42_N$.

In FIG. 2, the slope generating circuit 25, the comparators $26n$, the counter 41, and the latch circuits $42_n$ constitute the A/D converter.

The solid-state image pickup device 31 thus configured can reduce the number of counters to only one, namely the counter 41.

However, when the single counter 41 is provided as in the solid-state image pickup device 31, a greater distance between the counter 41 and the latch circuit $42_n$ causes a greater delay in counted pulse indicating the count value supplied from the counter 41 to the latch circuit $42_n$, due to wire resistance and wire capacity. Consequently, between the column of the latch circuit $42_n$ having a short distance to the counter 41, and the column of the latch circuit $42_{n'}$ (n'=1, 2, ..., N) having a long distance to the counter 41, a difference resulted from wire resistance and wire capacity occurs in pixel data outputted, thereby adversely affecting image quality.

There are also those having a plurality of arrangements that an A/D converter (a comparator and a counter) is shared among a plurality of columns (for example, see Japanese Unexamined Patent Application Publication No. 2006-80861 hereinafter referred to as Patent Document 1).

However, in the configuration of the Patent Document 1, the pixel signals of a plurality of columns are serially transmitted to be A/D converted, thus lowering the transmission rate. The counter is required to operate for a number of columns, and the power consumption thereof becomes the same as the power consumption when each of the columns has a counter.

SUMMARY OF THE INVENTION

As described above, it has been difficult for the earlier developed solid-state image pickup devices to reduce power consumption.

Accordingly, it is desirable to reduce power consumption.

In accordance with one aspect of the present invention, there is provided an image pickup circuit which includes a plurality of circuit blocks each including a plurality of comparing elements, a single counter, and a plurality of storage units. Each of the plurality of comparing elements compare a pixel signal supplied through a vertical signal line connected to vertically aligned pixels in a plurality of pixels arranged in a matrix, and a slope signal whose voltage is changed from an initial voltage at a constant slope. The single counter counts an elapsed time since a voltage of the slope signal is started to change from the initial voltage. Each of the plurality of storage units store a count valued obtained by the counter, in accordance with a comparison result of the comparing elements, the count value corresponding to an elapsed time until the voltage of the slope signal is changed from the initial voltage to a voltage coinciding with the pixel signal.

In one embodiment, a pixel column in one circuit block among the plurality of circuit blocks may be arranged between two adjacent pixel columns aligned vertically in another one circuit block among the plurality of circuit blocks.

In one embodiment, a pixel signal of a pixel in the pixel column in one circuit block among the plurality of circuit blocks and a pixel signal of a pixel in the pixel column aligned vertically in another one circuit block among the plurality of circuit blocks may be added.

In one embodiment, a pixel signal of a pixel in the pixel column in one circuit block among the plurality of circuit blocks arranged between two adjacent pixel columns aligned vertically in another one circuit block among the plurality of circuit blocks may be thinned out.

In one embodiment, the storage unit may include a latch circuit or a sample-hold circuit.

The circuit blocks may further may include selecting elements for selecting the pixel signals supplied from the plurality of the vertical signal lines to supply the selected pixel signals to the comparators.

According to one embodiment, in the plurality of circuit blocks, the plurality of comparators compare a pixel signal supplied through the vertical signal line connected to the vertically aligned pixels in the plurality of pixels arranged in the matrix, and the slope signal whose voltage is changed at the constant slope from the predetermined initial voltage. In accordance with the comparison result of the comparators, the plurality of storage units store the count value obtained by the single counter, corresponding to the elapsed time until the slope signal voltage is changed from the initial voltage to the voltage coinciding with the pixel signal.

According to an embodiment of the present invention, the image pickup circuit is capable of reducing power consumption.

The above summary of the present invention is not intended to describe each illustrated embodiment or every implementation of the present invention. The figures and the detailed description which follow more particularly exemplify these embodiments.

DETAILED DESCRIPTION OF EMBODIMENTS

Before describing the following embodiments of the invention, the association between the configuration requirements of the invention and the embodiments described and shown in the specification or the drawings will be described below. That is, the following is to confirm that the embodiments supporting the invention are described and shown in the specification or the drawings. Even if there is a certain embodiment which is described in the specification or the drawings but not described here as an embodiment corresponding to a certain configuration requirement of the invention, it does not mean that this embodiment does not correspond to this configuration requirement. Reversely, even if a certain embodiment is described as one corresponding to a certain configuration requirement, it does not mean that the embodiment does not correspond to any configuration requirement other than that.

Figure 1:
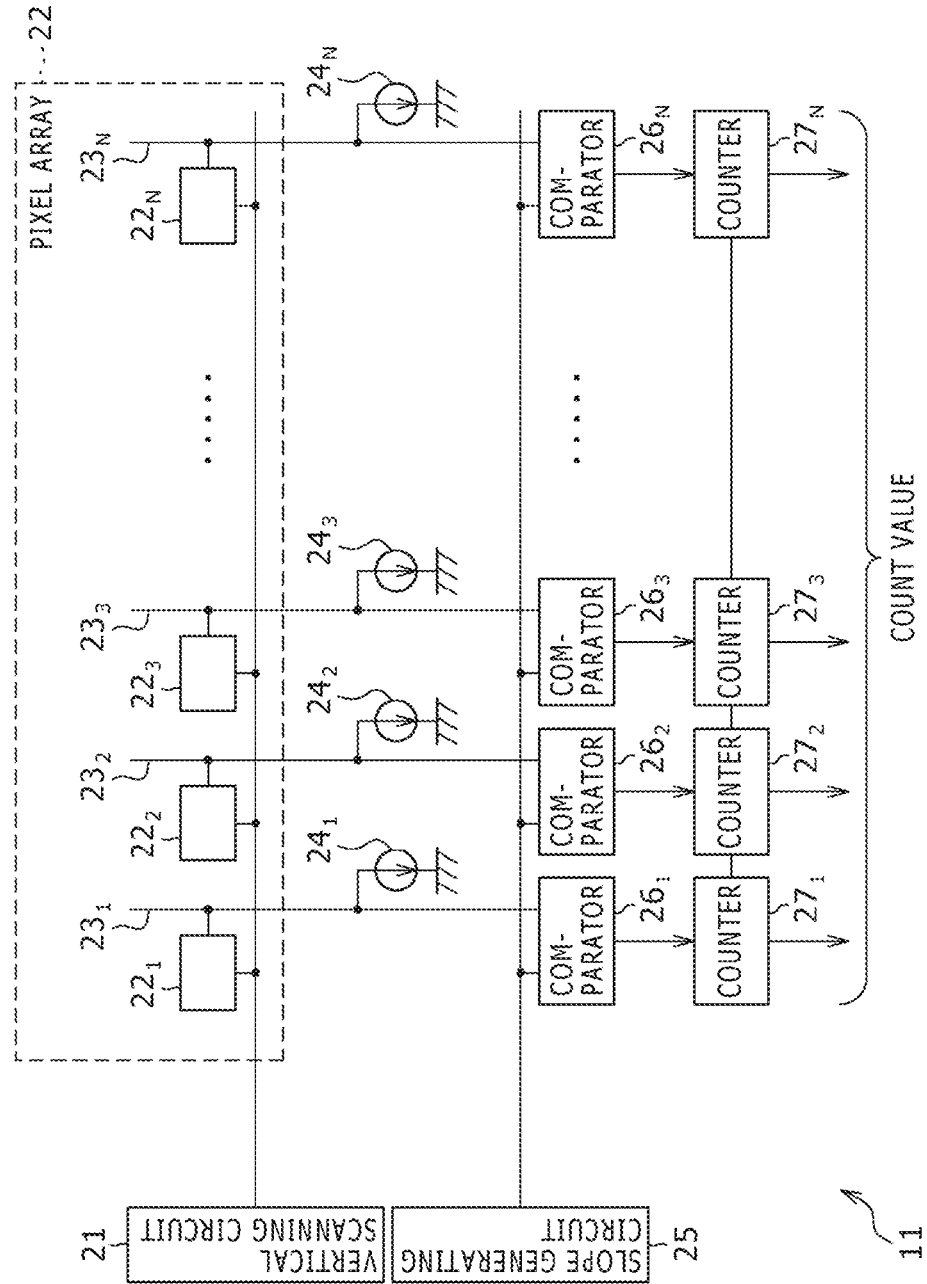
FIG. 1 is a block diagram showing the configuration of an embodiment of a solid-state image pickup device employing column AD method.
Figure 2:
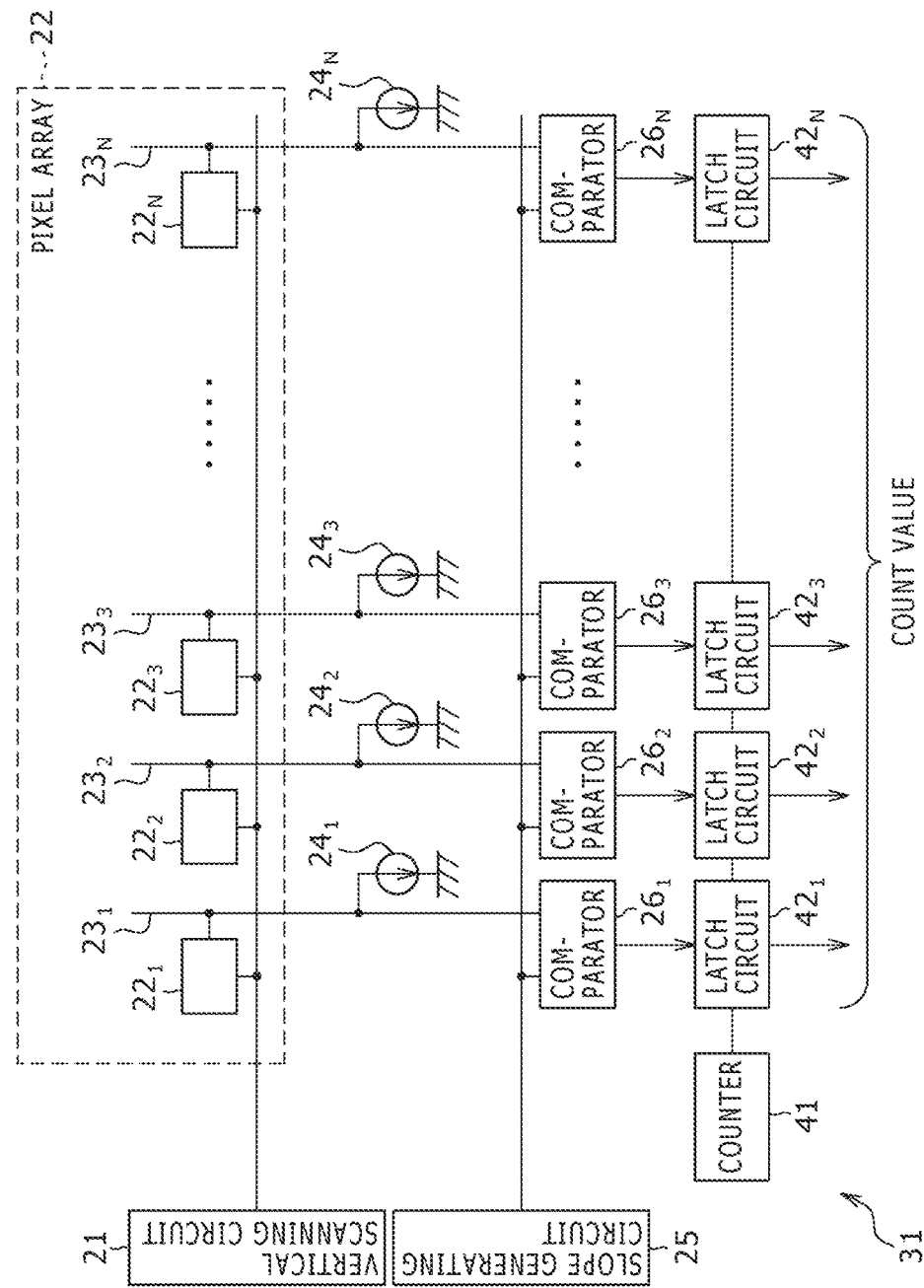
FIG. 2 is a block diagram showing the configuration of other embodiment of the solid-state image pickup device employing the column AD method.
Figure 3:
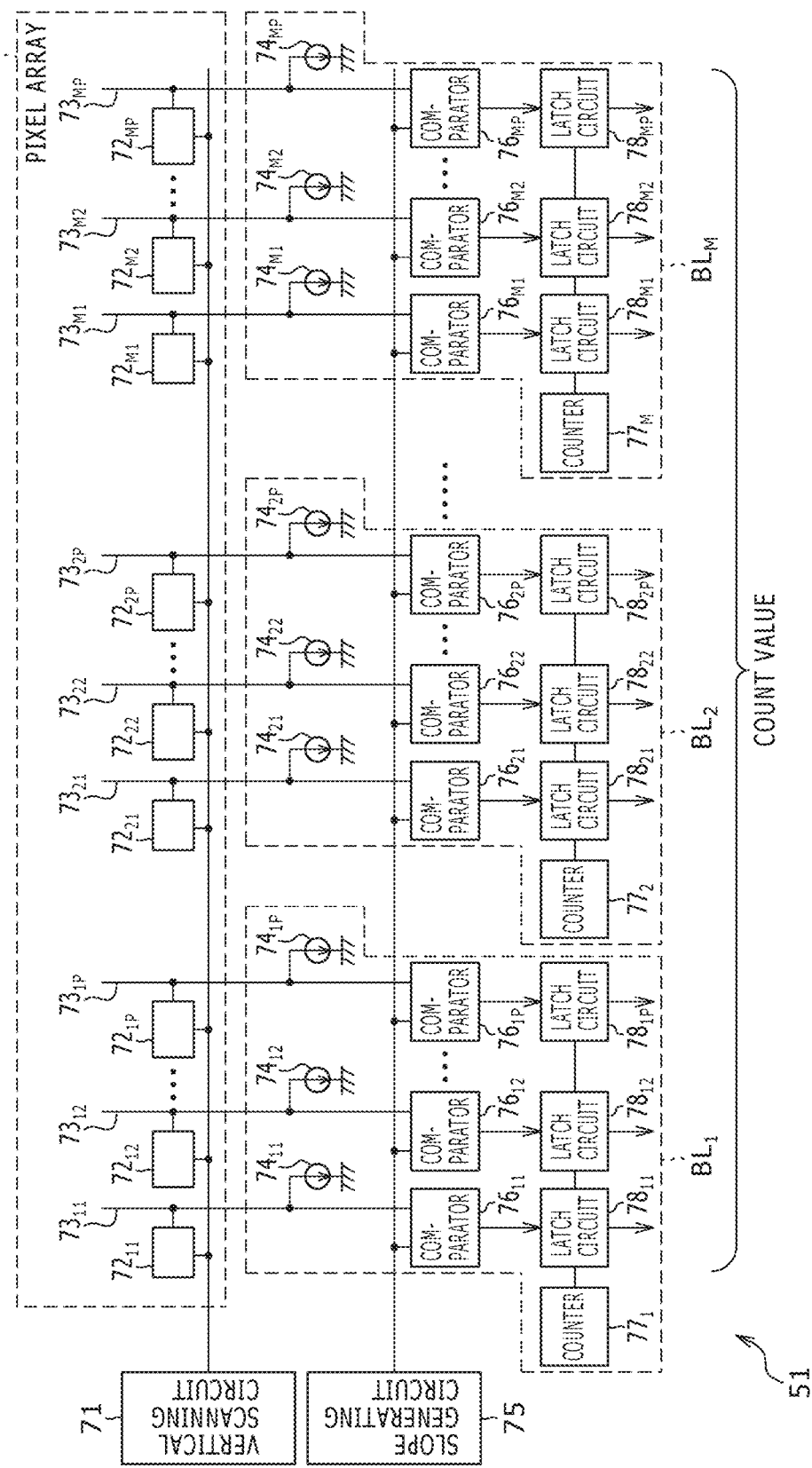
FIG. 3 is a block diagram showing a configuration example of an embodiment of the solid-state image pickup device to which the present invention is applied.

The image pickup circuit of one embodiment of the invention includes a plurality of circuit blocks (e.g. circuit blocks $BL_1$ to $BL_M$ in FIG. 3), each having a plurality of comparing elements (e.g. comparators $76_{m1}$ to $76_{mP}$ in FIG. 3), a counter (e.g. a counter $77_m$ in FIG. 3) and a plurality of storage units (e.g. latch circuits $78_{m1}$ to $78_{mP}$ in FIG. 3). Each of the plurality of comparing elements compares a pixel signal supplied through a vertical signal line connected to vertically aligned pixels in a plurality of pixels arranged in a matrix, and a slope signal whose voltage is changed from a predetermined initial voltage at a constant slope. The counter counts an elapsed time since a voltage of the slope signal is started to change from the initial voltage. Each of the plurality of storage units stores a count value obtained by the counter, in accordance with a comparison result of the comparing elements, the count value corresponding to an elapsed time until the voltage of the slope signal is changed from the initial voltage to a voltage coinciding with the pixel signal.

Figure 7:
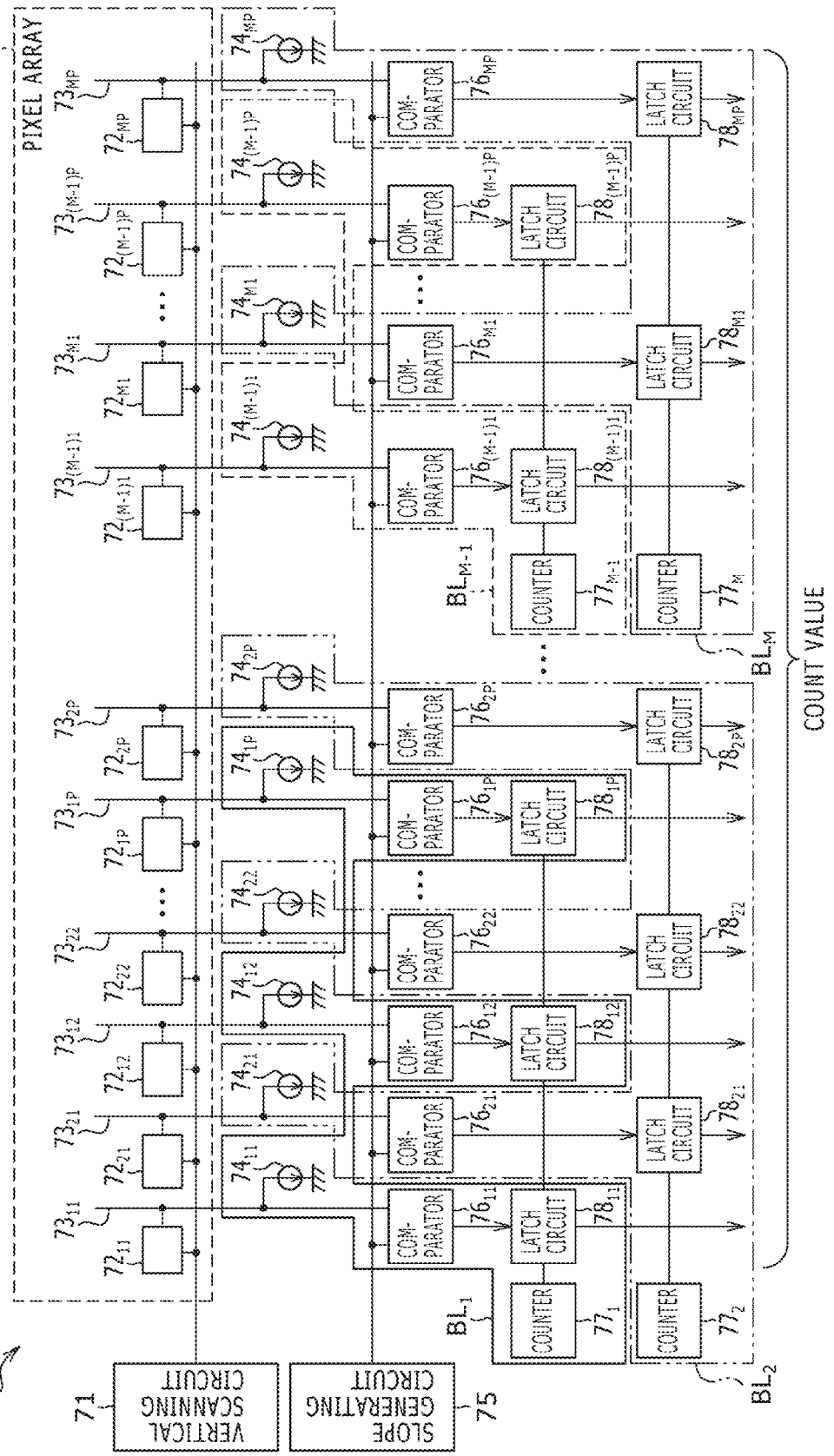
FIG. 7 is a block diagram showing a configuration example of other embodiment of the solid-state image pickup device to which the present invention is applied.

A pixel column aligned vertically in a circuit block (e.g. a circuit block $BL_2$ in FIG. 7) among the plurality of circuit blocks may be arranged between two adjacent pixel columns aligned vertically in another one circuit block (e.g. a circuit block $BL_1$ in FIG. 7).

In one embodiment, the image pickup device may be configured to add a pixel signal of a pixel (e.g. a pixel $72_{11}$ in FIG. 7) of the pixel column aligned vertically in the one circuit block among the plurality of circuit blocks, and a pixel signal of a pixel (e.g. a pixel $72_{21}$ in FIG. 7) of the pixel column aligned vertically in the another one circuit block among the plurality of circuit blocks.

In one embodiment, the image pickup device may be configured to thin out the pixel signals of pixels (e.g. pixels $72_{21}$ to $72_{2P}$ in FIG. 7) of the pixel columns vertically aligned in one circuit block among the plurality of circuit blocks, wherein the pixel columns are arranged between the two adjacent pixel columns aligned vertically in another one circuit block, the pixel columns each having pixels (e.g. pixels $72_{11}$ to $72_{1P}$ in FIG. 7).

Figure 8:
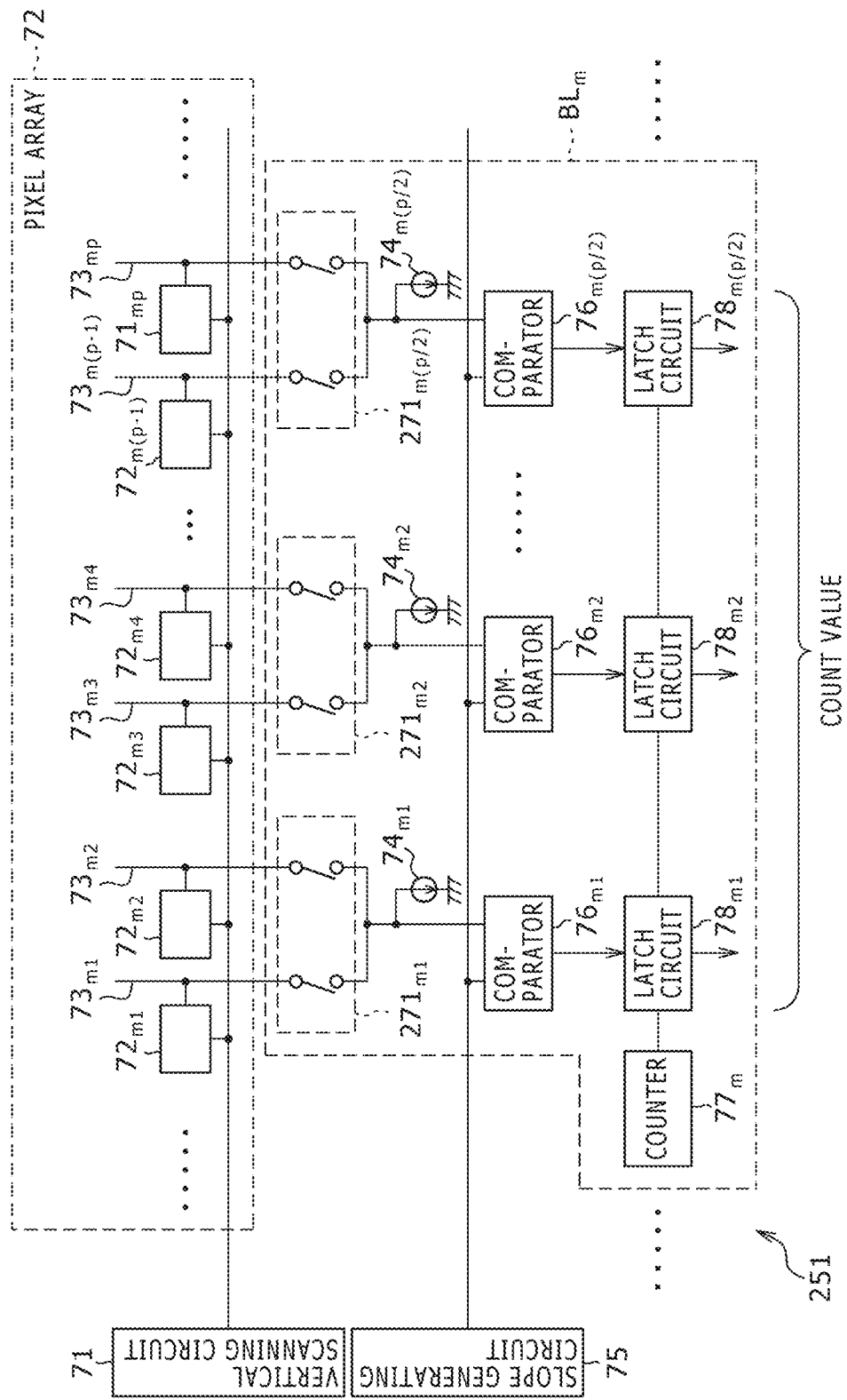
FIG. 8 is a block diagram showing a configuration example of still other embodiment of the solid-state image pickup device to which the present invention is applied.

The circuit blocks may further include selecting elements (e.g. switches $271_{m1}$ to $27_{1m(P/2)}$) in FIG. 8) for selecting the pixel signals supplied from the plurality of vertical signal lines to supply the selected pixel signals to the comparing elements.

Embodiments of the present invention will be described below with reference to the accompanying drawings.

FIG. 3 is block diagram showing a configuration example of the solid-state image pickup device according to an embodiment of the present invention.

A solid-state image pickup device 51 of FIG. 3 may be, for example, a CMOS sensor or other solid-state image pickup device.

In FIG. 3, the solid-state image pickup device 51 includes one vertical scanning circuit 71, one pixel array 72, vertical signal lines the number of which is M×P, $73_{11}$ to $73_{1P}$, $73_{21}$ to $73_{2P}$, ..., and $73_{M1}$ to $73_{MP}$ (each M and P is a positive integer, particularly an integer equal to or greater than 2), current sources $74_{11}$ to $77_{1P}$ the number of which is M×P, $74_{21}$ to $74_{2P}$, ..., and $74_{M1}$ to $74_{MP}$, one slope generating circuit 75, comparators the number of which is M×P, $76_{11}$ to $76_{1P}$, $76_{21}$ to $76_{2P}$, ..., and $76_{M1}$ to $76_{MP}$, counters the number of which is M, $77_1$ to $77_M$, and latch circuits the number of which is M×P, $78_{11}$ to $78_{1P}$, $78_{21}$ to $78_{2P}$, ..., and $78_{M1}$ to $78_{MP}$.

For the sake of convenience, the arrangement of the vertical signal lines $73_{11}$ to $73_{1P}$, $73_{21}$ to $73_{2P}$, ..., and $73_{M1}$ to $73_{MP}$ are hereinafter referred to as "vertical signal lines $73_{11}$ to $73_{MP}$, or "vertical signal lines $73_{mp}$ (m=1, 2, ..., and M; p=1, 2, ..., and P)." The same is applied to other arrangements.

Similarly, the arrangement made up of P vertical signal lines $73_{m1}$ to $73_{mP}$, P current sources $74_{m1}$ to $74_{mP}$, P comparators $76_{m1}$ to $76_{mP}$, a counter $77_m$, and P latch circuits $78_{m1}$ to $78_{mP}$ is hereinafter referred to as a "circuit block $BL_m$." In this case, the solid-state image pickup device 51 includes a vertical scanning circuit 71, a pixel array 72, a slope generating circuit 75, and circuit blocks $BL_1$ to $BL_M$ the number of which is M.

Under control of a controller (not shown), the vertical scanning circuit 71 supplies sequentially output control signals for controlling the outputs of pixel signals to the pixels $72_{11}$ to $72_{MP}$ arranged vertically in the pixel array 72 at a predetermined timing.

The pixel array 72 is composed of a plurality of pixels arranged in a matrix. FIG. 3 shows the pixels $72_{11}$ to $72_{MP}$ horizontally aligned in one column, with vertically aligned pixels omitted. In the pixel array 72, the vertically aligned individual pixels $72_{mp}$ output sequentially pixel signals on the basis of the output control signal supplied from the vertical scanning circuit 71.

In the pixel array 72 of FIG. 3, the pixels $72_{11}$ to $72_{MP}$ the number of which is M×P are arranged horizontally. The pixel $72_{mp}$ photoelectrically converts the incident light, and outputs the pixel signal of a voltage corresponding to the light. These pixels $72_{11}$ to $72_{MP}$ are connected to the M×P vertical signal lines $73_{11}$ to $73_{Mp}$, respectively, and the pixel signals outputted from the pixels $72_{11}$ to $72_{MP}$ are supplied through the vertical signal lines $73_{11}$ to $73_{MP}$ to one of two input terminals in each of the comparators $76_{11}$ to $76_{MP}$ the number of which is M×P, respectively. The pixels $72_{11}$ to $72_{MP}$ are also grounded through the M×P current sources $74_{11}$ to $74_{MP}$, respectively.

The slope generating circuit 75 supplies a slope signal, whose voltage is changed, namely drop (or rise), at a constant slope from an initial voltage, to the other of the two input terminals in each of the comparators $76_{11}$ to $76_{MP}$, respectively.

The comparators $76_{11}$ to $76_{MP}$ compare the pixel signals supplied from the pixels $72_{11}$ to $72_{MP}$ and the slope signal supplied from the slope generating circuit 75, and supply comparative signals representing the comparison results to the latch circuits the number of which is M×P, $78_{11}$ to $78_{MP}$, respectively.

The counters $77_m$ count a predetermined clock signal in a circuit block $BL_m$, and supply the count value to the latch circuits $78_{m1}$ to $78_{mP}$.

More specifically, the counter $77_1$ supplies the count value of a clock signal to the latch circuits $78_{11}$ to $78_{1P}$ in the circuit block $BL_1$, and the counter $77_2$ supplies the count value of a clock signal to the latch circuits $78_{21}$ to $78_{2P}$ in the circuit block $BL_2$.

Similarly, the counter $77_M$ supplies the count value of a clock signal to the latch circuits $78_{M1}$ to $78_{MP}$ in the circuit block $BL_M$.

In accordance with the comparative signal from the comparator $76_{mp}$, the latch circuit $78_{mp}$ stores (latches) the count value counted by the counters $77_m$ in the circuit blocks $BL_m$, and supplies the stored count value to the circuit of the subsequent stage (not shown). In the circuit of the subsequent stage, pixel data are outputted on the basis of the count values supplied from the latch circuits $78_{m1}$ to $78_{mP}$.

The slope generating circuit 75, and the comparator $76mp$, the counters $77_m$, and the latch circuit $78_{mp}$ in the circuit blocks $BL_m$ constitute the A/D converter.

Next, the operation of the solid-state image pickup device 51 will be described with reference to FIG. 4.

Figure 4:
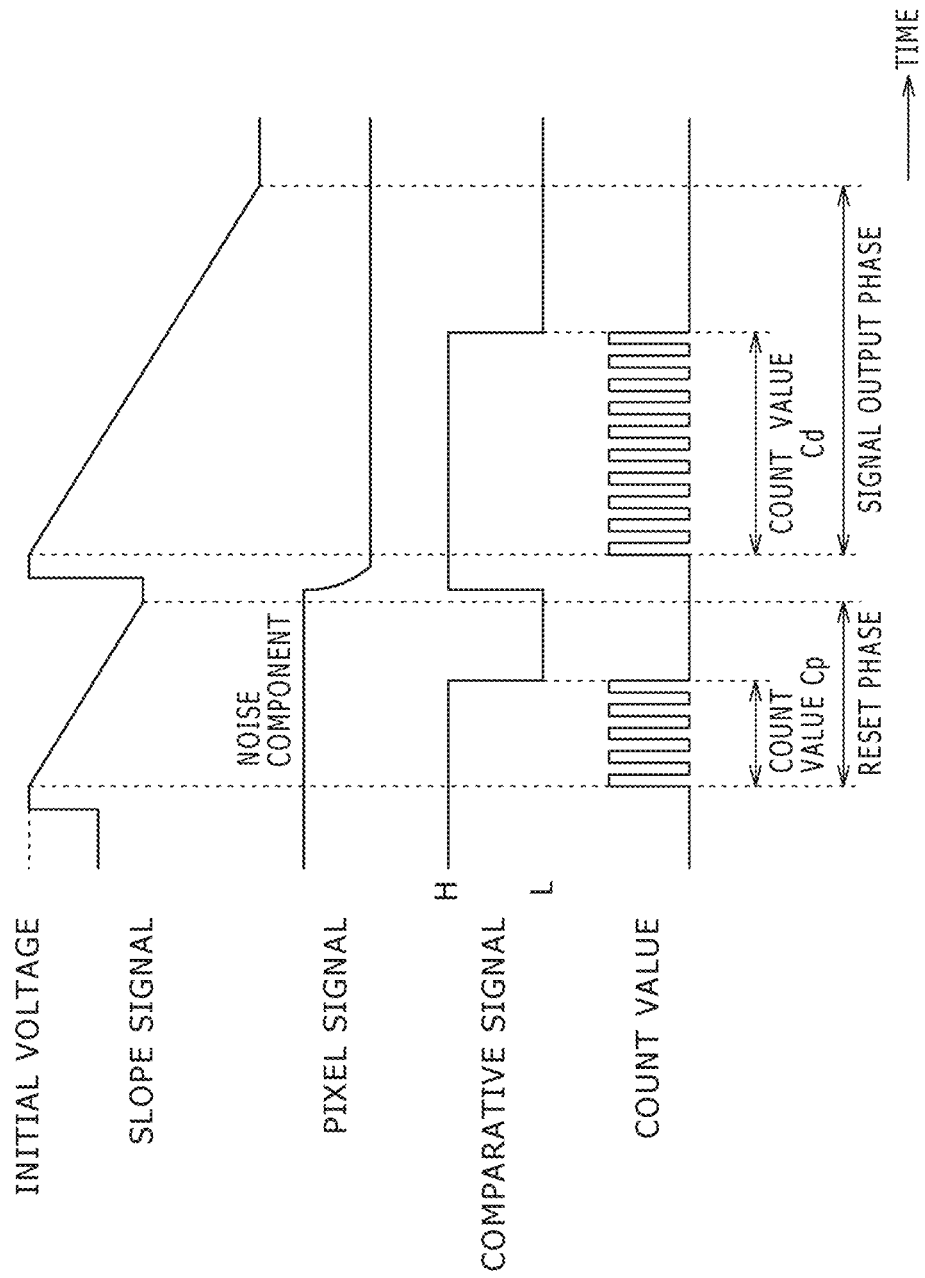
FIG. 4 is a time chart for explaining the operation of the solid-state image pickup device.

FIG. 4 is a timing chart for explaining the operation of the solid-state image pickup device 51.

The following is the operation of the solid-state image pickup device 51, focusing on the p-th pixel $72_{mp}$ of the circuit blocks $BL_m$.

In FIG. 4, a slope signal supplied from the slope generating circuit 75 to the comparator $76_{mp}$, a pixel signal supplied from the pixel $72_{mp}$ of the pixel array 72 to the comparator $76_{mp}$, a comparative signal supplied from the comparator $76_{mp}$ to the latch circuit $78_{mp}$, and a count value latched by the latch circuit $78_{mp}$ are plotted in the top-down order, plotting time as the abscissa.

The slope generating circuit 75 supplies the slope signal whose voltage drops at a constant slope from an initial voltage, as shown at the first plot from the top in FIG. 4.

During the time the slope signal voltage drops from the initial voltage, there are a reset phase having a predetermined duration and a signal output phase having a longer duration than the reset phase. The slope signal is a signal causing a reset phase and a signal output phase subsequent to the reset phase to be repeated in one set form.

The pixel $72_{mp}$ of the pixel array 72 supplies a pixel signal to the comparator $76_{mp}$ according to the output control signal supplied from the vertical scanning circuit 71, as shown at the second plot from the top in FIG. 4.

In the solid-state image pickup device 51, light enters the pixel $72_{mp}$ in the signal output phase, whereas the light entering into the pixel $72_{mp}$ is intercepted in the reset phase.

As a result, in the reset phase, noise components are supplied as a pixel signal from the pixel $72_{mp}$ to the comparator $76_{mp}$. During the signal output phase, a pixel signal containing a charge-based signal component corresponding to the light receiving amount of a photodiode (not shown) is supplied from the pixel $72_{mp}$ to the comparator $76_{mp}$.

As shown at the third plot from the top in FIG. 4, the comparator $76_{mp}$ compares the slope signal and the pixel signal, and supplies an H (high) level comparative signal to the latch circuit $78_{mp}$ when the pixel signal voltage is smaller than the slope signal voltage, and supplies an L (low) level comparative signal to the latch circuit $78_{mp}$ when the pixel signal voltage is larger than the slope signal voltage.

Here, the initial voltage of the slope signal is larger than the maximum value of voltages attainable by the pixel signal. Accordingly, as the slope signal voltage drops from the initial voltage, the slope signal voltage is changed from a voltage larger than the pixel signal to a voltage coinciding with the pixel signal. The change of the slope signal voltage from the voltage larger than the pixel signal to the voltage coinciding with the pixel signal causes the comparative signal to be inverted from the H level to the L level.

As presented in the fourth plot from the top (the lowermost) of FIG. 4, the comparator $78_{mp}$ stores according to the comparative signal from the comparator $76_{mp}$, the count values (the counted pulses) obtained by the counters $77_m$, corresponding to a period of time that the slope signal voltage is changed from the initial voltage to the voltage coinciding with the pixel signal, and supplies the count values to the circuit of the subsequent stage (not shown).

That is, the latch circuit $78_{mp}$ stores the count values counted by the counters $77_m$ (reset phase count values Cp) in the period between the time when the slope signal voltage starts to drop in the reset phase and the time when the comparative signal is inverted from the H level to the L level. Thereafter, the latch circuit $78_{mp}$ stores the count values counted by the counters $77_m$ (signal output phase count values Cd) in the period between the time when the slope signal voltage starts to drop in the signal output phase and the time when the comparative signal is inverted from the H level to the L level. The latch circuit $78_{mp}$ supplies successively the reset phase count values Cp and the signal output phase count values Cd to the circuit of the subsequent stage (not shown).

In the circuit of the subsequent stage, a digital CDS (corrected double sampling) is performed to obtain a difference Cp-Cd between the reset phase count value Cp and the signal output phase count value Cd, and the difference Cp-Cd is outputted as signal components of pixel data.

As described with reference to FIG. 3, owing to the arrangement that in each of the plurality of circuit blocks $BL_1$ to $BL_M$, the single counter $77_m$ is shared among P columns (P sets of the comparator $76_{mP}$ and the latch circuit $78_{mP}$), the number of counters can be reduced to a 1/P than the arrangement that one counter is provided for every column. This enables the suppression of circuit area, reducing power consumption.

This is effective to prevent circuit area and power consumption from being increased with increasing the number of pixels and the processing speed in future solid-state image pickup devices.

The counters 77m may be noise generating source because they operate almost all of the circuit operating time. However, the solid-state image pickup device 51 requires less number of the counters $77_m$, thereby achieving a noise reduction.

Although the individual counters $77_m$ are shared among the columns the number of which is P in the foregoing description, the circuit blocks $BL_m$ may have different numbers of columns P sharing the individual counters $77_m$.

Preferably, the numbers of columns P sharing the single counter $77_m$ is determined (optimized) by considering the delay due to wire resistance and wire capacity when the solid-state image pickup device 51 is operated at high speed.

Figure 5:
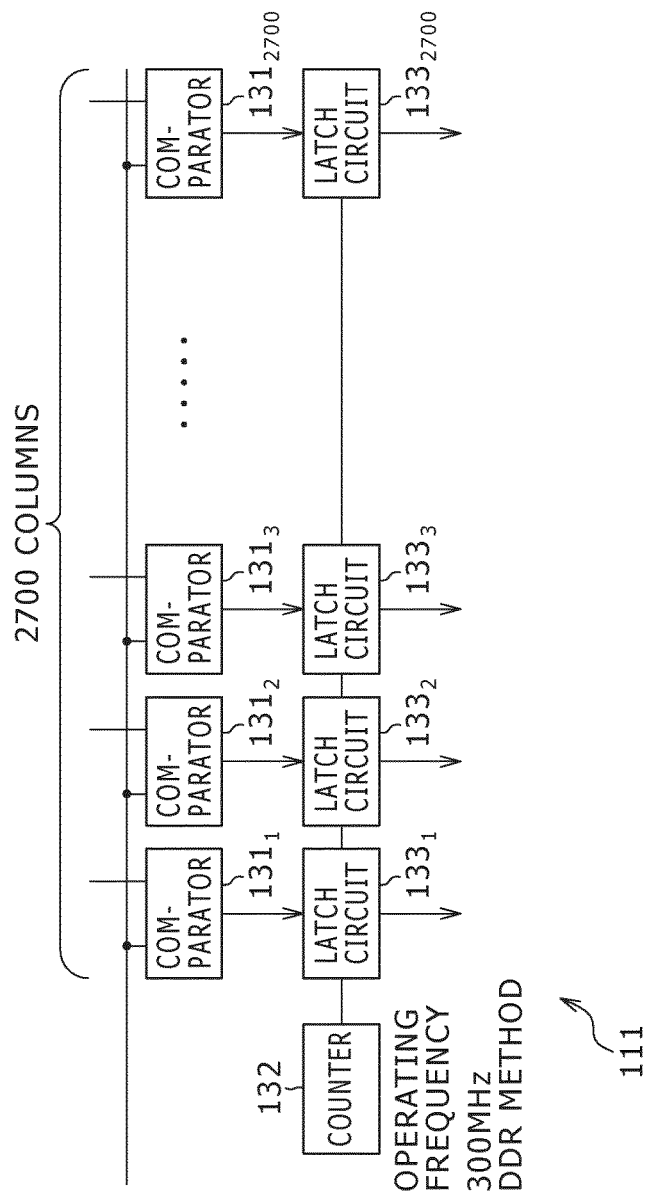
FIG. 5 is a block diagram showing a configuration example of a solid-state image pickup device in which a counter is shared among all columns.

FIG. 5 is a block diagram showing a configuration example of the solid-state image pickup device in which a single counter is shared among all columns.

A solid-state image pickup device 111 of FIG. 5 includes comparators $131_1$ to $131_{2700}$ the number of which is 2700, a counter 132, and latch circuits $133_1$ to $133_{2700}$ the number of which is 2700. In the solid state image pickup device 111, the single counter 132 is shared among 2700 columns (2700 sets of a comparator $131_i$ and a latch circuit $133_i$ (i is an integer in the range 1 to 2700)).

The comparators $131_1$ to $131_{2700}$, the counter 132, and the latch circuits $133_1$ to $133_{2700}$ in FIG. 5 have the same basic operations as the comparator $76_{mp}$, the counter $77_m$ and the latch circuit $78_{mp}$, respectively, and the description thereof is omitted here.

For example, assuming that the counter 132 counts count values in DDR (double data rate) method by setting the operating frequency at 300 MHz, the count value is incremented by one for 1.67 nsec. It is also assumed that the count value of the counter 132 is sequentially propagated to the latch circuits $133_1$ to $133_{2700}$ in this order.

It is further assumed that the wire resistance between the adjacent latch circuits $133_i$ and $133_{i+1}$ is 0.7Ω and the wire capacity therebetween is 1.48 fF.

In this case, the wire resistance R between the latch circuit $133_1$ having the shortest distance to the counter 132 and the latch circuit $133_{2700}$ having the longest distance to the counter 132 is approximately 2 kΩ (≈2700×0.7Ω), and the wire capacity C therebetween is approximately 4 pF (≈2700×1.48×10$^{-15}$ F).

Figure 6:
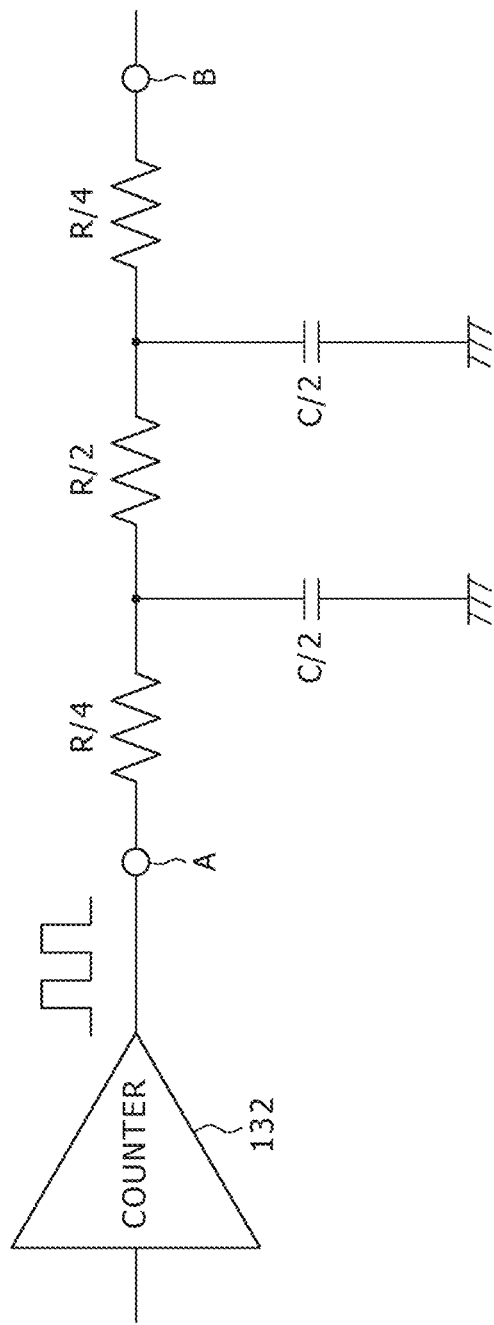
FIG. 6 is a circuit diagram modeling wire resistance and wire capacity generated in the solid-state image pickup device of FIG. 5.

FIG. 6 is a circuit diagram modeling wire resistance and wire capacity generated in the solid-state image pickup device 111 of FIG. 5.

In FIG. 6, the latch circuit $133_1$ having the shortest distance to the counter 132 is represented by point A, and the latch circuit $133_{2700}$ having the longest distance to the counter 132 is represented by point B. The wire resistance R and the wire capacity C between the points A and B are modeled by an n-type circuit.

When a simulation is performed using the circuit shown in FIG. 6, a 1.78 nsec delay occurs between the count pulse (the count value) supplied from the counter 132 to the latch circuit $133_1$ and the count pulse supplied from the counter 132 to the latch circuit $133_{2700}$.

This delay is greater than 1.67 nsec for one count of the counter 132, and a difference of one count occurs between the count value in the column having the shortest distance to the counter 132 and the count value in the column having the longest distance to the counter 132.

Accordingly, in circuit of the subsequent stage (not shown) to which the count values from the latch circuits $133_1$ to $133_{2700}$ are supplied, when pixel data are outputted by subjecting the count values to gain multiplication by a predetermined number, a 1 count difference of the count value in the pixel data outputted is increased to a 4 count difference in a 4× gain multiplication, a 8 count difference in a 8× gain multiplication, and a 16 count difference in a 16× gain multiplication.

On the other hand, assuming in the example of FIG. 5 that the number of columns is 675 (=2700/4) and a single counter 132 is shared among the 675 columns, the wire resistance and the wire capacity between the column having the shortest distance to the counter 132 and the column having the longest distance to the counter 132 are an approximately ¼ of the case where a single counter 132 is shared among 2700 columns. That is, the wire resistance R is approximately 0.47 kΩ (≈675×0.7Ω), and the wire capacity C is approximately 1 pF (≈675×1.48×10$^{-15}$ F).

When the single counter 132 is shared among the 675 columns and the simulation is performed by using the circuit shown in FIG. 6, a 0.31 nsec delay occurs between the counted pulse supplied to the latch circuit $133_1$ having the shortest distance to the counter 132 and the counted pulse supplied to the latch circuit $133_{675}$ having the longest distance to the counter 132. The value 0.31 nsec is sufficiently smaller than 1.67 nsec that is the time corresponding to the 1 count of the counter 132. Consequently, there is no difference between the count value in the column having the shortest distance to the counter 132 and the count value in the column having the longest distance to the counter 132.

Thus, deterioration of image quality can be prevented while reducing the power consumption of the solid-state image pickup device 111, by setting the number of columns sharing a single counter 132 so that the delay due to the wire resistance R and the wire capacity C when the solid-state image pickup device 111 is operated at high speed becomes sufficiently smaller than the time required for a 1 count.

That is, when the number of columns of the solid-state image pickup device 111 is 2700 as in the case of FIG. 5, the reduction in power consumption and the prevention of deterioration in image quality can be achieved by setting four counters similar to the counter 132 so that a single counter 132 is shared among 675 columns.

FIG. 7 is a block diagram showing a configuration example of the solid-state image pickup device according to another embodiment of the present invention.

In FIG. 7, the same references have been used as in FIG. 3 for similar components, and the description thereof is omitted.

A solid-state image pickup device 151 of FIG. 7 is identical to the solid-state image pickup device 51 of FIG. 3 in that the device 151 includes a vertical scanning circuit 71, a pixel array 72, a slope generating circuit 75, and circuit blocks $BL_1$ to $BL_M$ the number of which is M, except for the following point.

That is, in the solid-state image pickup device 151 shown in FIG. 7, a column of vertically aligned pixels in a second circuit block $BL_{m+1}$ among the circuit blocks $BL_1$ to $BL_M$ the number of which is M is arranged between two columns of vertically aligned pixels in a circuit block $BL_m$. In the solid-state image pickup device 51 shown in FIG. 3, the column in the circuit block $BL_{m+1}$ is not arranged between the two columns in the first circuit block $BL_m$.

More specifically, pixels $72_{21}$ to $72_{2P}$ in the circuit block BL2 are arranged between pixels $72_{11}$ to $72_{1P}$ in the circuit block $BL_1$, respectively.

Similarly, pixels $72_{M1}$ to $72_{MP}$ in the circuit block $BL_M$ are arranged between pixels $72_{(M-1)1}$ to $72_{(M-1)P}$ in the circuit block $BL_{M-1}$, respectively.

That is, in the pixel array 72 of FIG. 7, pixels $72_{11}$ to $72_{MP}$ the number of which is M×P are arranged horizontally, and the order thereof is different from that in the configuration of FIG. 3. These pixels are arranged in the following order: the pixels $72_{11}$, $72_{21}$, $72_{22}$ ..., $72_{1P}$, $72_{2P}$ ..., $72_{(m-1)P}$, $72_{mP}$ ..., $721_{(M-1)1}$, $72_{M1}$, ..., $72_{(M-1)P}$ and $72_{MP}$.

Thus, in the solid-state image pickup device 151, instead of the configuration that a single counter $77_m$ is shared among the adjacent pixels (columns), a single counter $77_m$ is shared among pixels (columns) arranged every other pixel columns.

The solid-state image pickup device 151 shown in FIG. 7 has a function of pixel addition (pixel signal addition), so-called binning function.

That is, the solid-state image pickup device 151 in FIG. 7 has a binning function of performing pixel addition between two horizontally adjacent pixels, namely, pixels $72_{11}$ and $72_{21}$, pixels $72_{12}$ and $72_{22}$, ..., pixels $72_{1P}$ and $72_{2P}$, ..., respectively. When the binning function is turned on, the pixel signals of the horizontally adjacent pixels $72_{mp}$ and $72_{(m+1)p}$ are added, and the pixel signal as the result of addition is supplied through a vertical signal line $73_{mp}$ to a comparator $76_{mp}$.

At this time, it is unnecessary to process the pixel signals on the vertical signal line $73_{(m+1)p}$. Accordingly, in the circuit block $BL_{m+1}$ of the circuit block $BL_m$ and the circuit block $BL_{m+1}$, the latch circuit $78_{(m+1)p}$ is not required to operate, and the counter $77_{m+1}$ connected to the latch circuit $78_{(m+1)p}$ is also not required to operate, where m=1, 3, ..., M−1.

Thus, the counter $77_{m+1}$ in the circuit block $BL_{m+1}$, connected to the vertical signal line $73_{(m+1)p}$ not used to supply the pixel signal as the result of addition, is not required to operate during the addition of pixels (when the binning function is turned on), permitting a further reduction in power consumption.

In the above description, the addition of pixels is performed between the two horizontally adjacent pixels. Without limiting to this, the addition of pixels may be performed among two horizontally adjacent pixels and two vertically adjacent pixels (2×2 pixels) or a total of four pixels, or alternatively among 3×3 pixels or a total of nine pixels.

In addition to the binning function, pixel thinning out (pixel signal thinning out) function may be imparted to the solid-state image pickup device 151 of FIG. 7.

That is, the solid-state image pickup device 151 in FIG. 7 has the pixel thinning out function to perform pixel thinning out of the pixels $72_{21}, 72_{22}, \ldots, 72_2P, \ldots,$ and $72_{(m+1)p}$. When the pixel thinning out function is turned on, the pixel signal of the pixel $72_{(m+1)p}$ is thinned out, eliminating the necessity of processing the pixel signals on the vertical signal line $73_{(m+1)p}$. Therefore, in the circuit block $BL_{m+1}$ of the circuit block $BL_m$ and the circuit block $BL_{m+1}$, the latch circuit $78_{(m+1)p}$ is not required to operate, and the counter $77_{m+1}$ connected to the latch circuit $78_{(m+1)p}$ is also not required to operate, where m=1, 3, ..., M−1.

Thus, the counter $77_{m+1}$ of the circuit block $BL_{m+1}$, connected to the vertical signal line $73_{(m+1)p}$ not used to supply the pixel signal as a pixel thinning out result, is not required to operate during the pixel thinning out, permitting a further reduction in power consumption.

In the above description, the pixel thinning out is performed every other pixel (every other column). Without limiting to this, the pixel thinning out may be performed every two or more pixels (every two or more columns).

FIG. 8 is a block diagram showing a configuration example of still other embodiment of the solid-state image pickup device to which the present invention is applied.

In FIG. 8, the same references have been used as in FIG. 3 for similar components, and the description thereof is omitted.

A solid-state image pickup device 251 of FIG. 8 is identical to the solid-state image pickup device 51 of FIG. 3 in that circuit blocks $BL_m$ have counters $77_m$. The solid-state image pickup device 251 is different from the solid-state image pickup device 51 in that the circuit blocks $BL_m$ have P/2 pieces of current sources $74_{mp}$, comparators $76_{mp}$ and latch circuits $78_{mp}$, and P/2 pieces of switches $271_{mp}$.

Under control of a controller (not shown), the switches $271_{mp}$ selectively supply pixel signals supplied from vertical signal lines $73_{m(2p-1)}$ and $73_{m(2p)}$, to the comparators $76_{mp}$.

Thus, the solid-state image pickup device 251 has the configuration that a single comparator $76_{mp}$ is shared between two pixels (two columns) $72_{m(2p-1)}$ and $72_{m(2p)}$.

Although in FIG. 8, a single comparator $76_{mp}$ is shared between the two pixels (columns) $72_{m(2p-1)}$ and $72_{m(2p)}$, a single comparator $76_{mp}$ may be shared among more than two pixels (columns) or n pixels (n columns).

Unlike the Patent Document 1 having P/2 arrangements that a single A/D converter (the comparator and the counter) is shared among n columns, the solid-state image pickup device 251 has the arrangement that a counter is shared among P/2 arrangements that a comparator and a latch circuit are shared among n columns. Therefore, the number of counters needed for n×(P/2) columns can be reduced from P/2 to one, permitting a reduction in power consumption.

As described above, the solid-state image pickup device 51, the solid-state image pickup device 151 and the solid-state image pickup device 251 are capable of reducing the number of the counters $77_m$, thereby reducing power consumption than the case of providing a counter for every column. That is, in each of the plurality of circuit blocks $BL_m$, the plurality of comparators $76_{mp}$ compare a pixel signal supplied through a vertical signal line connected to vertically aligned pixels $72_{mp}$ among the plurality of pixels arranged in the matrix, and the slope signal whose voltage is changed at the constant slope from the predetermined initial voltage. In accordance with the comparison results of the comparators $76_{mp}$, the plurality of latch circuits $78_{mp}$ store the count values obtained by the counters $77_m$, corresponding to an elapsed time from when the slope signal voltage is changed from the initial voltage to the voltage coinciding with the pixel signal.

Although the latch circuits $78_{mp}$ store the count values in the embodiments described above, a sample-hold circuit or other storage media may store the count values.

Although there has been shown herein and described certain embodiments of the invention, it will be understood that many changes and modifications may be made therein without departing from the spirit or scope of the invention.

What is claimed is:

1. An imaging device comprising:
   a plurality of pixels arranged in a matrix of columns and rows, the plurality of pixels including a first pixel in an ith column, a second pixel in an (i+1)th column, a third pixel in a jth column, and a fourth pixel in a (j+1)th column;
   a reference signal generation circuit;
   a first comparator coupled to the first pixel and the reference signal generation circuit;
   a second comparator coupled to the second pixel and the reference signal generation circuit;
   a first counter coupled to the first comparator and the second comparator;
   a third comparator coupled to the third pixel and the reference signal generation circuit;
   a fourth comparator coupled to the fourth pixel and the reference signal generation circuit; and
   a second counter coupled to the third comparator and the fourth comparator.

2. The imaging device according to claim 1, wherein the imaging device comprises a single reference signal generation circuit.

3. The imaging device according to claim 1, wherein the first comparator is coupled to the first pixel via a first signal line, the second comparator is coupled to the second pixel via a second signal line, the third comparator is coupled to the third pixel via a third signal line, and the fourth comparator is coupled to the fourth pixel via a fourth signal line.

4. The imaging device according to claim 3,
   wherein the reference signal generation circuit is configured to output a reference signal,
   wherein the first comparator compares the reference signal to a voltage on the first signal line, the second comparator compares the reference signal to a voltage on the second signal line, the third comparator compares the reference signal to a voltage on the third signal line, and the fourth comparator compares the reference signal to a voltage on the fourth signal line.

5. The imaging device according to claim 4, wherein the reference signal is a slope signal having a voltage that changes from an initial voltage at a constant slope.

6. The imaging device according to claim 3, wherein each of the first, second, third, and fourth signal lines extends in a first direction, and
   wherein the first counter and the second counter are arranged in a second direction different from the first direction.

7. The imaging device according to claim 6, wherein the second direction is perpendicular to the first direction.

8. The imaging device according to claim 1, wherein the first counter is coupled to the first comparator via at least one latch circuit.

9. The imaging device according to claim 1, wherein the plurality of pixels further includes a fifth pixel in a kth column and a sixth pixel in a (k+1)th column, and wherein the imaging device further comprises:
   a fifth comparator coupled to the fifth pixel and the reference signal generation circuit;

a sixth comparator coupled to the sixth pixel and the reference signal generation circuit; and
a third counter coupled to the fifth comparator and the sixth comparator.

10. The imaging device according to claim 9, wherein the first counter, the second counter, and the third counter are arranged in a direction of the rows in the matrix.

11. The imaging device according to claim 1, wherein the second comparator is adjacent to the third comparator in a direction of the rows in the matrix.

12. The imaging device according to claim 1, wherein the first counter and the second counter are arranged in a direction of the rows of the matrix.

13. An imaging device comprising:
a pixel array comprising a plurality of pixels;
a plurality of signal lines, each of which is coupled to at least one pixel in the pixel array and extends in a first direction;
a reference signal generation circuit;
a plurality of comparators, each of which is coupled to one of the plurality of signal lines and the reference signal generation circuit; and
a plurality of counters, wherein each of the plurality of counters is coupled to at least two comparators of the plurality of comparators, and wherein the plurality of counters are arranged in a second direction different from the first direction.

14. The imaging device according to claim 13, wherein the imaging device comprises a single reference signal generation circuit.

15. The imaging device according to claim 13, wherein the plurality of comparators includes a first comparator, a second comparator, a third comparator, and a fourth comparator, wherein the plurality of signal lines includes a first signal line, a second signal line, a third signal line, and a fourth signal line, and wherein the plurality of pixels includes a first pixel, a second pixel, a third pixel, and a fourth pixel.

16. The imaging device according to claim 15,
wherein the first comparator is coupled to the first signal line, the second comparator is coupled to the second signal line, the third comparator is coupled to the third signal line, and the fourth comparator is coupled to the fourth signal line,
wherein the first signal line is coupled to the first pixel and the second signal line is coupled to the second pixel, wherein the first pixel and the second pixel are adjacent in the second direction in the pixel array,
wherein the third signal line is coupled to the third pixel and the fourth signal line is coupled to the fourth pixel, wherein the third pixel and the fourth pixel are adjacent in the second direction in the pixel array.

17. The imaging device according to claim 15,
wherein the reference signal generation circuit is configured to output a reference signal,
wherein the first comparator compares the reference signal to a voltage on a first signal line, the second comparator compares the reference signal to a voltage on second signal line, the third comparator compares the reference signal to a voltage on a third signal line, and the fourth comparator compares the reference signal to a voltage on a fourth signal line,
wherein the first signal line is coupled to the first pixel and the second signal line is coupled to the second pixel, wherein the first pixel and the second pixel are adjacent in the second direction in the pixel array,
wherein the third signal line is coupled to the third pixel and the fourth signal line is coupled to the fourth pixel,
wherein the third pixel and the fourth pixel are adjacent in the second direction in the pixel array.

18. The imaging device according to claim 17, wherein the reference signal is a slope signal having a voltage that changes from an initial voltage at a constant slope.

19. The imaging device according to claim 13, wherein the second direction is perpendicular to the first direction.

20. The imaging device according to claim 13, wherein the each of the plurality of counters is coupled to the at least two comparators via at least one latch circuit.

21. The imaging device according to claim 13, wherein the plurality of counters includes four counters.

22. An imaging device comprising:
a first plurality of pixels;
a second plurality of pixels;
a first plurality of signal lines, wherein each of the first plurality of signal lines is coupled to at least one of the first plurality of pixels;
a second plurality of signal lines, wherein each of the second plurality of signal lines is coupled to at least one of the second plurality of pixels;
a reference signal generation circuit;
a first plurality of comparators, wherein each of the first plurality of comparators is coupled to the reference signal generation circuit and at least one of the first plurality of signal lines;
a second plurality of comparators, wherein each of the second plurality of comparators is coupled to the reference signal generation circuit and at least one of the second plurality of signal lines;
a first counter coupled to the first plurality of comparators; and
a second counter coupled to the second plurality of comparators,
wherein none of the signal lines of the second plurality of signal lines is arranged between two signal lines of the first plurality of signal lines.

23. The imaging device according to claim 22, wherein the imaging device comprises a single reference signal generation circuit.

24. The imaging device according to claim 22,
wherein the reference signal generation circuit is configured to output a reference signal,
wherein each of the first plurality of comparators is configured to compare the reference signal to a voltage on at least one of the first plurality of signal lines, and
wherein each of the second plurality of comparators is configured to compare the reference signal to a voltage on at least one of the second plurality of signal lines.

25. The imaging device according to claim 22, wherein each of the first plurality of comparators is connected to multiple signal lines of the first plurality of signal lines via a switching circuit.

26. An imaging device comprising:
a first plurality of pixels;
a second plurality of pixels;
a first plurality of signal lines, wherein each of the first plurality of signal lines is coupled to at least one of the first plurality of pixels;
a second plurality of signal lines, wherein each of the second plurality of signal lines is coupled to at least one of the second plurality of pixels;
a reference signal generation circuit;
a first plurality of comparators, wherein each of the first plurality of comparators is coupled to the reference signal generation circuit and at least one of the first plurality of signal lines;

a second plurality of comparators, wherein each of the second plurality of comparators is coupled to the reference signal generation circuit and at least one of the second plurality of signal lines;

a first counter coupled to the first plurality of comparators; and a second counter coupled to the second plurality of comparators, wherein at least one signal line of the second plurality of signal lines is arranged between two signal lines of the first plurality of signal lines.

27. The imaging device according to claim 26, wherein the imaging device comprises a single reference signal generation circuit.

28. The imaging device according to claim 26, wherein the first plurality of signal lines are arranged alternating with the second plurality of signal lines.

29. The imaging device according to claim 26,
wherein the reference signal generation circuit is configured to output a reference signal,
wherein each of the first plurality of comparators is configured to compare the reference signal to a voltage on at least one of the first plurality of signal lines, and
wherein each of the second plurality of comparators is configured to compare the reference signal to a voltage on at least one of the second plurality of signal lines.

30. The imaging device according to claim 26, wherein each of the first plurality of comparators is connected to multiple signal lines of the first plurality of signal lines via a switching circuit.

* * * * *